US011941652B2

(12) United States Patent
Bloy et al.

(10) Patent No.: US 11,941,652 B2
(45) Date of Patent: Mar. 26, 2024

(54) AUTOMATIC LINKING OF LOYALTY ACCOUNTS OF AUTHORIZED USERS TO LOYALTY ACCOUNTS OF PRIMARY USERS

(71) Applicant: The Toronto-Dominion Bank, Toronto (CA)

(72) Inventors: Adrian Bloy, Ottawa (CA); Morgan Klein-MacNeil, Toronto (CA); Syrous Delavari-Maraghi, Vaughan (CA); Trevor Ross Gimbel, Mississauga (CA); Caroline Elizabeth Wilkinson, Mississauga (CA); Sonali Suresh Nagarkar, Toronto (CA)

(73) Assignee: The Toronto-Dominion Bank

( * ) Notice: Subject to any disclaimer, the term of this patent is extended or adjusted under 35 U.S.C. 154(b) by 0 days.

(21) Appl. No.: 17/819,072

(22) Filed: Aug. 11, 2022

(65) Prior Publication Data

US 2022/0383355 A1 Dec. 1, 2022

Related U.S. Application Data

(63) Continuation of application No. 16/660,248, filed on Oct. 22, 2019, now Pat. No. 11,449,884.

(51) Int. Cl.
*G06Q 30/00* (2023.01)
*G06Q 20/22* (2012.01)
*G06Q 20/34* (2012.01)
*G06Q 20/40* (2012.01)
*G06Q 30/0207* (2023.01)
(Continued)

(52) U.S. Cl.
CPC ....... *G06Q 30/0215* (2013.01); *G06Q 20/227* (2013.01); *G06Q 20/3572* (2013.01); *G06Q 20/4012* (2013.01); *G06Q 30/0233* (2013.01); *G06Q 30/0236* (2013.01); *G06Q 40/02* (2013.01)

(58) Field of Classification Search
CPC .................... G06Q 20/227; G06Q 20/3572
See application file for complete search history.

(56) References Cited

U.S. PATENT DOCUMENTS 8,458,016 B1 6/2013 Medina, III et al.
10,621,658 B1 4/2020 Sahni et al.
(Continued)

OTHER PUBLICATIONS

Non-Final Office Action issued in U.S. Appl. No. 16/660,248 dated Oct. 20, 2020, 13 pages.
(Continued)

*Primary Examiner* — Yehdega Retta
(74) *Attorney, Agent, or Firm* — Fish & Richardson P.C.

(57) ABSTRACT

The present disclosure involves systems, software, and computer implemented methods for automatically providing linking partner loyalty rewards accounts using authorized user and primary user information associated with an account. One example method includes authenticating a user at a partner system, and receiving from the user information associated with an account. The information associated with user's account is communicated to a financial institution system via an API where the user can then be verified as an authorized user on an account. The financial institution system then provides the partner system with information associated with the primary user of the account, and the partner system can link a loyalty account of the primary user with the loyalty account of the authenticated user.

20 Claims, 4 Drawing Sheets

(51) Int. Cl.
_G06Q 30/0226_ (2023.01)
_G06Q 40/02_ (2023.01)

(56) References Cited

U.S. PATENT DOCUMENTS

| | | |
|---|---|---|
| 10,783,544 B1 | 9/2020 | Stringfellow |
| 2003/0083933 A1 | 5/2003 | McAlear |
| 2004/0050929 A1 | 3/2004 | Fayfield |
| 2009/0299846 A1 | 12/2009 | Brueggemann et al. |
| 2011/0191157 A1 | 8/2011 | Blackhurst et al. |
| 2012/0239482 A1 | 9/2012 | McInnes et al. |
| 2021/0118001 A1 | 4/2021 | Bloy et al. |

OTHER PUBLICATIONS

Final Office Action issued in U.S. Appl. No. 16/660,248 dated Mar. 25, 2021, 14 pages.
Non-Final Office Action issued in U.S. Appl. No. 16/660,248 dated Aug. 9, 2021, 18 pages.
Final Office Action issued in U.S. Appl. No. 16/660,248 dated Feb. 7, 2022, 14 pages.
Office Action in Canada Appln. No. 3,059,701, dated Sep. 21, 2023, 12 pages.

US 11,941,652 B2

AUTOMATIC LINKING OF LOYALTY ACCOUNTS OF AUTHORIZED USERS TO LOYALTY ACCOUNTS OF PRIMARY USERS

CROSS-REFERENCE OT RELATED PATENT APPLICATIONS

This application is a continuation of and claims the benefit of priority to U.S. patent application Ser. No. 16/660,248, filed Oct. 22, 2019, the contents of which are incorporated by reference herein.

TECHNICAL FIELD

This disclosure generally relates to computer-implemented methods, software, and systems for automatically linking loyalty rewards accounts of authorized users of a credit account with the loyalty rewards account of the primary user of the credit account.

BACKGROUND

Credit account customers represent a significant customer segment for financial and lending institutions. In an effort to encourage usage of their financial products, many financial institutions and payment card providers can offer various loyalty points and reward perk systems to reward customers for loyalty to and usage of their payment instruments.

SUMMARY

The present disclosure involves systems, software, and computer implemented methods for automatically providing linking partner loyalty rewards accounts using authorized user and primary user information associated with an account. A first example system includes a communications module, at least one memory storing instructions, a repository storing a plurality of account profiles associated with a plurality of accounts, each account profile associated with a primary user. Optionally one or more authorized users may also be associated with each account profile. The first example system further includes a repository a plurality of loyalty rewards accounts, and at least one hardware processor interoperably coupled with the at least one memory and the communications module. The instructions can cause to hardware processor to perform the following operations, including receiving credentials associated with a loyalty account from the user, and authenticating the user based on the credentials. The user can then input account information which can be communicated via an API to a system managing a set of potential accounts to be linked to the loyalty account. The system managing the set of potential accounts can query the repository of account profiles and determine if the provided account information is associated with an authorized user of an account having a particular primary user. Upon determining that the provided account information is associated with an authorized user, a success message can be sent, via the API with information associated with the particular primary user. The message can then be used to link the loyalty account of the authenticated user with the loyalty account of the particular primary user.

Implementations can optionally include one or more of the following features.

In some instances, the plurality of accounts, accounts associated with the account information, and the account associated with the particular primary user are credit accounts.

In some instances, the loyalty account associated with the particular primary user is associated with a set of earned benefits, and wherein, after linking the loyalty account associated with the particular primary user to the loyalty account associated with the authorized user, the set of earned benefits are associated with the loyalty account associated with the authorized user.

In some instances, the set of earned benefits include perk and rewards points, and the rewards points can be redeemed for rewards.

In some instances, the earned set of benefits are earned based on transactions associated with the account information.

In some instances if the authenticated user is not determined to be an authorized user of an account, an error message can be send that includes an error code. In these instances the loyalty account of the authorized user is not linked to a loyalty account of a particular primary user.

In some instances the account information provided includes any suitable combination of an account number, a name on the account, a date of birth of the account holder, or an address associated with the account.

In some instance the account information associated with the authorized user is also linked to the loyalty account associated with the particular primary user. In these instances the authorized user can contribute to the set of earned benefits associated with the loyalty account of the particular primary user.

Similar operations and processes may be performed in a different system comprising at least one processor and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. Additionally, similar operations can be associated with or provided as computer-implemented software embodied on tangible, non-transitory media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
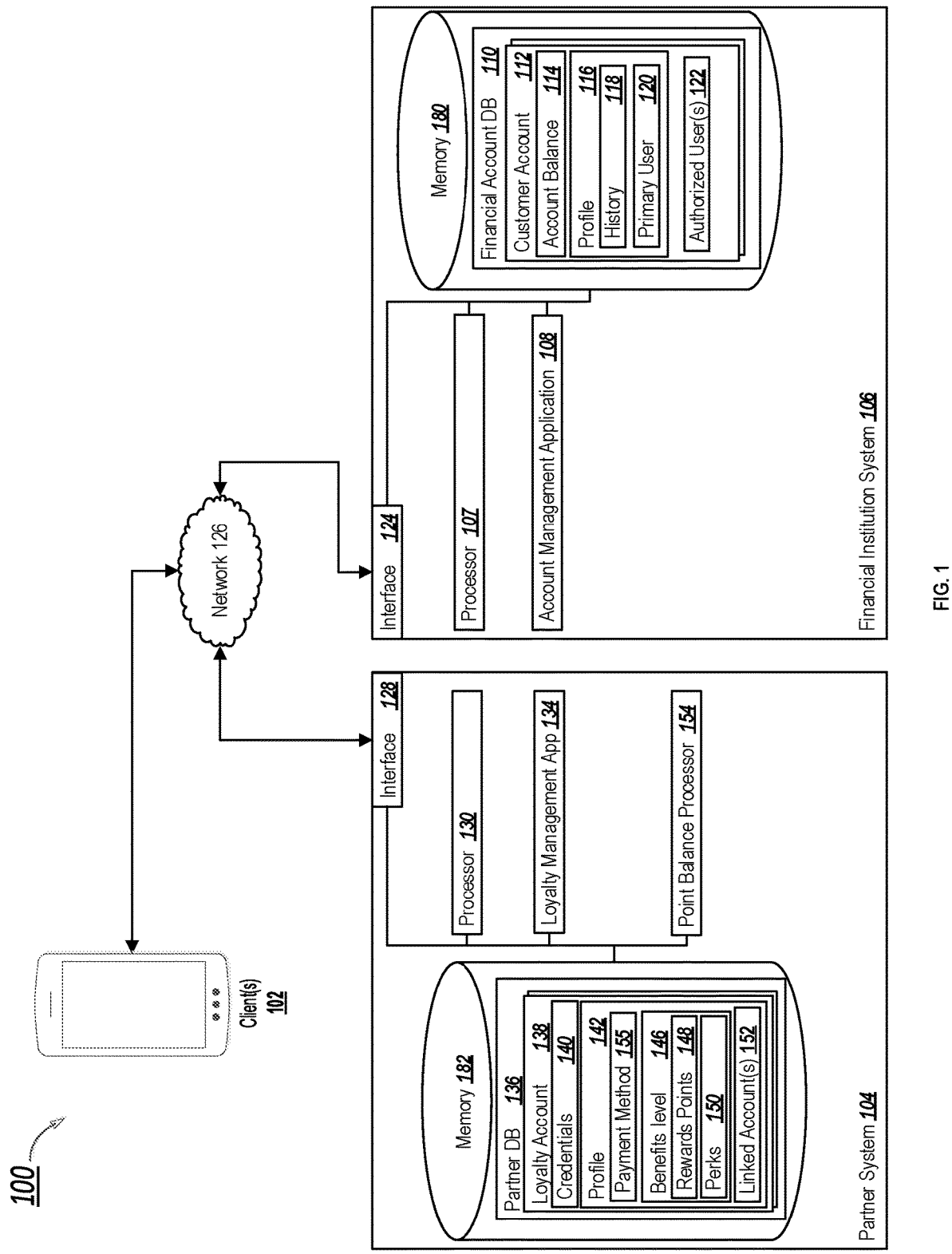
FIG. 1 depicts an overview diagram of a system for linking loyalty rewards accounts.

This disclosure describes a system for linking a loyalty rewards account associated with a person who is an authorized user of a credit account with a loyalty rewards account of the primary user of the credit account based on their shared credit account. In some instances, multiple persons use the same credit account with a primary user and one or more authorized users of the account, each with their own unique credit card. In many instances, the ability for multiple customers on the same account to share perks or rewards may be a significant selling point for customers.

The present solution allows authorized users of a credit card (e.g., a cardholder's child or spouse) to access the benefits of the partner rewards program associated with the primary user's existing status or loyalty level, allowing the holder, or primary user, of a credit card to share their partner loyalty benefits with authorized users of their credit card. In some instances, the opposite can be implemented, where authorized users may be able to grant the primary users access to their loyalty benefits.

For example, assume Jane is the primary account holder of a credit account and has linked that credit account to a frequent flyer account (i.e., a loyalty rewards account). Since Jane regularly travels and purchases airline tickets using the credit account, she has access to several loyalty benefits from her frequent flyer account, such as VIP lounge access, discounted first class seats, waived luggage fees, and others provided by that program. If John is an authorized user of Jane's credit account and has his own frequent flyer account, the present solution allows John to link his frequent flyer account to Jane's credit account and access the loyalty benefits associated with Jane's frequent flyer account.

In some implementations of the described solution, a financial institution hosts or provides access to an application programming interface (API) that can be used as an entry point or interface to allow authorized partner systems (e.g., a loyalty rewards account providers) to verify that a user associated with a loyalty rewards program account is an authorized user of a credit account, where the credit account is associated with an existing primary user who has a different loyalty rewards program account. In some instances a user associated with a loyalty rewards program account can be associated with a rewards status level, which is earned through various qualifying actions associated with the partner system (e.g., purchases, hotel stays, etc.). In some instances, simply having a particular card associated with the partner (e.g., a co-branded card) may result in a particular status being provided. The authorized user can access a partner system entry point (e.g., a website, portal, mobile application, kiosk, etc.) and provide credentials (e.g., partner system username and password) to log in and be authenticated by the partner system to confirm their identity. The user can then provide personal credit account information (e.g., a credit card number). In some instances, the user provides a first name, last name, and last four digits of an account number to access and/or connect the accounts. In another instance, the user provides a minimum amount of information required to identify a particular account, which may be any suitable information, including biometric data, user login information, or any other type of information or verification. The partner system can access the financial institution's API and transmit the personal credit account information to the financial institution. In turn, the financial institution can use the received credit account information to execute a query against a database of credit accounts and account users that the financial institution provides in order to confirm whether the provided credit account information is associated with an authorized user of a credit account with an existing loyalty rewards program account associated with the partner system. If so, then the API can return a success message that contains identifying information associated with the primary user of the credit account. The partner system can then link the authorized user's loyalty rewards program account with the loyalty rewards program account of the primary user, allowing the authorized user to benefit from the loyalty program level of the primary user.

In some instances where the authorized user's loyalty account is at a relatively higher status than the primary user, the authorized user's loyalty program account can be used to provide the additional benefits to the loyalty program account of the primary user. Another advantage is that this entire process can be done automatically without human intervention by the partner or the financial institution. In some instances, the partner system or the financial institution can maintain information regarding clients who link accounts (e.g., demographics or spending habits) among other analytic information. This information can be used to improve products or services offered by both the partner system and the financial institution. By allowing a partner system to authenticate the client, the client need not log in multiple times or to multiple systems. Instead, the client logs into the partner system, is authenticated, and the financial institution can provide information to the partner system based on that authentication.

To assist a person skilled in the art better understand the technical solutions in the present specification, the following describes example technical solutions in the implementations of the present specification with reference to the accompanying drawings in the implementations of the present specification. The described implementations represent merely some, rather than all, of the implementations of the present specification. Other implementations obtained by a person of ordinary skill in the art based on one or more implementations of the present specification without creative efforts shall fall within the protection scope of the implementations of the present specification.

Turning to the illustrated example implementation, FIG. 1 is a block diagram illustrating an example system 100 for automatically linking the loyalty rewards account corresponding to an authorized user of a credit account with the loyalty rewards account corresponding to a primary user of the same credit account. The authorized user's credit card may also be linked to the loyalty rewards program associated with the primary user of the credit account using the described solution. In general, the system 100 allows the illustrated components to share and communicate information across devices and systems (e.g., financial institution (FI) system 106, partner system 104, and one or more client devices 102, among others) via network 126. As described herein, the FI system 106 can be a cloud-based component or system (partially or fully), while in other instances, non-cloud systems can be used. In some instances, non-cloud-based systems, such as on-premise systems, client-server applications, and applications running on one or more client devices, as well as combinations thereof, can use or adapt the processes described herein. Although components are shown individually, in some implementations, functionality of two or more components, systems, or servers can be provided by a single component, system, or server.

As used in the present disclosure, the term "computer" is intended to encompass any suitable processing device. For example, FI system 106 and the partner system 104 can be any computer or processing device such as, for example, a blade server, general-purpose personal computer (PC), Mac® workstation, UNIX-based workstation, or any other suitable device. Moreover, although FIG. 1 illustrates a single FI system 106, the FI system 106 can be implemented using a single system or more than those illustrated, as well as computers other than servers, including a server pool. In other words, the present disclosure contemplates computers other than general-purpose computers, as well as computers without conventional operating systems. Similarly, the partner system 104 can be any system that can request data and/or interact with the FI system 106. The partner system 104, in some instances, can be a desktop system, a client terminal, or any other suitable device, including a mobile device, such as a smartphone, tablet, smartwatch, or any other mobile computing device. In general, each illustrated component can be adapted to execute any suitable operating system, including Linux, UNIX, Windows, Mac OS®, Java™, Android™, Windows Phone OS, or iOS™, among others. The partner system 104 can include one or more specific applications executing on the partner system 104, or the partner system 104 can include one or more Web browsers or web applications that can interact with particular applications executing remotely from the partner system 104, such as the loyalty management application 134, or account management application 108, among others.

The FI system 106 can be associated with the one or more applications or platforms, and can be associated with or a part of a cloud platform or system. As illustrated, the FI system 106 includes, or is associated with, interface 124, processor(s) 107, the account management application 108, a financial account database 110, and memory 180. While illustrated as provided by or included in the FI system 106, parts of the illustrated components can be separate or remote from the FI system 106. For example, while illustrated as a single system, the account management application 108 can be managed at a first system and/or application infrastructure, while the interface 124 can be managed at a second system and/or application infrastructure. In some instances, various applications (e.g., the loyalty management application 134 and the account management application 108) may be able to communicate and interact with each other through internal and/or external communications, including through one or more channels and protocols, one or more dedicated application programming interfaces (APIs), and/or interfaces through which information needed to execute is available. For purposes of the present illustration, these portions are illustrated together for ease of description.

Returning to the FI system 106 illustrated in FIG. 1, the interface 124 is used by the FI system 106 for communicating with other systems in a distributed environment—including within the system 100—connected to the network 126, e.g., partner system 104, one or more client devices 102 associated with one or more users (not shown), and other systems communicably coupled to the illustrated FI system 106 and/or network 126. Generally, the interface 124 comprises logic encoded in software and/or hardware in a suitable combination and operable to communicate with the network 126 and other components. More specifically, the interface 124 can comprise software supporting one or more communication protocols associated with communications such that the network 126 and/or interface's hardware is operable to communicate physical signals within and outside of the illustrated system 100. Still further, the interface 124 can allow the FI system 106 to communicate with the partner system 104 and/or other portions illustrated within the FI system 106 to perform the operations described herein.

Network 126 facilitates wireless or wireline communications between the components of the system 100 (e.g., between the FI system 106, the partner system(s) 104, or the client device(s) 102 etc.), as well as with any other local or remote computers, such as additional mobile devices, clients, servers, or other devices communicably coupled to network 126, including those not illustrated in FIG. 1. In the illustrated environment, the network 126 is depicted as a single network, but can be comprised of more than one network without departing from the scope of this disclosure, so long as at least a portion of the network 126 can facilitate communications between senders and recipients. In some instances, one or more of the illustrated components (e.g., the memory 180, the account management application 108, etc.) can be included within or deployed to network 126, or a portion thereof, as one or more cloud-based services or operations. The network 126 can be all or a portion of an enterprise or secured network, while in another instance, at least a portion of the network 126 can represent a connection to the Internet. In some instances, a portion of the network 126 can be a virtual private network (VPN). Further, all or a portion of the network 126 can comprise either a wireline or wireless link. Example wireless links can include 802.11a/b/g/n/ac, 802.20, WiMax, LTE, and/or any other appropriate wireless link. In other words, the network 126 encompasses any internal or external network, networks, sub-network, or combination thereof operable to facilitate communications between various computing components inside and outside the illustrated system 100. The network 126 can communicate, for example, Internet Protocol (IP) packets, Frame Relay frames, Asynchronous Transfer Mode (ATM) cells, voice, video, data, and other suitable information between network addresses. The network 126 can also include one or more local area networks (LANs), radio access networks (RANs), metropolitan area networks (MANs), wide area networks (WANs), all or a portion of the Internet, and/or any other communication system or systems at one or more locations.

The FI system 106 also includes one or more processors 107. Although illustrated as a single processor 107 in FIG. 1, multiple processors can be used according to particular needs, desires, or particular implementations of the system 100. Each processor 107 can be a central processing unit (CPU), an application specific integrated circuit (ASIC), a field-programmable gate array (FPGA), or another suitable component. Generally, the processor 107 executes instructions and manipulates data to perform the operations of the FI system 106. Specifically, the processor 107 executes the algorithms and operations described in the illustrated figures, as well as the various software modules and functionality, including the functionality for sending communications to and receiving transmissions from clients 170, as well as to other devices and systems. Each processor 107 can have a single or multiple core, with each core available to host and execute an individual processing thread. Further, the number of, types of, and particular processors 107 used to execute the operations described herein can be dynamically determined based on a number of requests, interactions, and operations associated with the FI system 106.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component can be fully or partially written or described in any appropriate computer language including C, C++, JavaScript, Java™, Visual Basic, assembler, Perl®, any suitable version of 4GL, as well as others.

The FI system 106 can include, among other components, several applications, entities, programs, agents, or other software or similar components capable of performing the operations described herein. As illustrated, the FI system 106 includes or is associated with the account management application 108.

The account management application 108 can be any application, program, other component, or combination thereof that is associated with a FI and used to manage and store user account-related information and metrics. The account management application 108 can access or receive information from one or more transactional systems, or can be a part of those transactional systems, where information relating to various user accounts is collected and information can be stored and/or referenced. In some instances, the account management application 108 can be a part of system executing, for example, a TSYS backend suite of applications managing one or more credit, debit, or other payment cards and accounts. The account management application 108 can, in some instances, store information relating to one or more payment card accounts, accounts associated with one or more payment cards, as well as financial accounts associated with one or more loyalty and/or reward programs. The account management application 108 can store information associated with a primary user of each account as well as information associated with one or more authorized users of each account.

The account management application 108 can in some instances, be associated with or manage a financial account database 110 or set of information, where the financial account database 110 can store information associated with one or more customer accounts 112. Each customer account 112 can be associated with a particular customer and/or specific customer account, also referred to as a primary user of the account. Additionally each customer account 112 can be associated with one or more authorized users, who are given access to the account with the permission of the primary user. When customers are associated with multiple accounts, each customer account 112 can be linked to other related accounts, or can be separate. Each customer account 112 can be associated with one or more payment cards, financial accounts (e.g., a credit or debit account), or both. Each customer account 112 can include an account balance 114, a profile 116, and any other suitable information or data. The account balance 114 can store information associated with a current account balance in a checking or savings account, a current balance associated with a credit card account, or any other information identifying a current balance of the corresponding customer account 112. The customer profile 116 can include any suitable information associated with the customer. In some instances, demographic information can be stored in the account profile 116. As illustrated, an account history 118 can be included in the profile 116, and can be used to provide historical information related to account usage by the customer, such as historical spending or payment information, as well as timeliness information related to payments associated with the customer account 112 and/or other associated accounts. In some instances, spending related to a partner associated with a corresponding loyalty account 138 can be monitored or recorded therein. Further each customer account 112 can be associated with a primary user 120. The primary user 120 can be the user who owns the account and is financially responsible for the account balance 114 and making payments. In some instances, the primary user 120 can optionally add one or more authorized users 122 to the account. Authorized users 122 can access funds or credit in the customer account 112 and can have a unique physical payment card. In some instances, a number or identifier associated with the card provided to the authorized user may be the same as the primary user's card, while in others, the numbers may be different. In some instances, the customer account 112 includes a separate profile 116 for each user (primary and authorized) in a particular customer account 112. In other instances, each customer account 112 includes a single profile 116, with information and history 118 for both the primary user 120 and the one or more authorized users 122. In still other instances, the primary user 120 and each of the authorized users 122 may have their own particular customer account 112, where each of the relations to a particular primary user or one or more authorized users can be part of the account information.

Memory 180 of the FI system 106 can represent a single memory or multiple memories. The memory 180 can include any memory or database module and can take the form of volatile or non-volatile memory including, without limitation, magnetic media, optical media, random access memory (RAM), read-only memory (ROM), removable media, or any other suitable local or remote memory component. The memory 180 can store various objects or data, including financial data, user and/or account information, administrative settings, password information, caches, applications, backup data, repositories storing business and/or dynamic information, and any other appropriate information associated with the FI system 106, including any parameters, variables, algorithms, instructions, rules, constraints, or references thereto. Additionally, the memory 180 can store any other appropriate data, such as VPN applications, firmware logs and policies, firewall policies, a security or access log, print or other reporting files, as well as others. While illustrated within the FI system 106, memory 180 or any portion thereof, including some or all of the particular illustrated components, can be located remote from the FI system 106 in some instances, including as a cloud application or repository, or as a separate cloud application or repository when the FI system 106 itself is a cloud-based system. In some instances, some or all of memory 180 can be located in, associated with, or available through one or more other financial systems of the associated financial institution. In those examples, the data stored in memory 180 can be accessible, for example, via network 126, and can be obtained by particular applications or functionality of the FI system 106. As illustrated and previously described, memory 180 includes the financial account database 110, as well as instructions for executing the account management application 108, the interface 124, and other applications and functionality.

As illustrated, one or more partner systems 104 can be present in the example system 100. The partner system 104 may be associated with a particular retailer or service provider, or may be a general rewards account associated with a plurality of retailers and service providers. Each partner system 104 can be associated with one or more loyalty accounts 138, each loyalty account 138 associated with a customer where a customer account 112 is linked. The partner system 104 can be a portal through which a particular customer accesses loyalty account information and can interact with one or more benefits of the loyalty account 138. As illustrated, the partner system 104 can include an interface 128 for communication (similar to or different from interface 124), at least one processor 130 (similar to or different from processor 107), a graphical user interface (GUI) (not shown), a loyalty management application 134, and a memory 182 (similar to or different from memory 180).

One or more users can access their associated loyalty account 138 in the partner database 136 by using a client device 102, and via the interface 128. The client device 102 can present a GUI provided by the partner system 104, via the loyalty management application 134 for the user to interact with. Users can provide credentials 140 and be authenticated by the partner system 104. Each user can be associated with one or more loyalty accounts 138 and unique credentials 140 for the partner system 104 associated with the user.

The illustrated partner system 104 is intended to encompass any computing device such as a desktop computer, laptop/notebook computer, mobile device, smartphone, personal data assistant (PDA), tablet computing device, one or more processors within these devices, or any other suitable processing device. In general, the partner system 104 and its components can be adapted to execute any operating system, including Linux, UNIX, Windows, Mac OS®, Java™ Android™, or iOS. In some instances, the partner system 104 can comprise a computer that includes an input device, such as a keypad, touch screen, or other device(s) that can interact with one or more third party applications, such as one or more dedicated mobile applications, including a loyalty application or other banking application. The partner system 104 can also interact with an output device (e.g., client device 102) that conveys information associated with the operation of the applications and their application windows to the user of the partner system 104. Such information can include digital data, visual information, or a GUI, as shown with respect to the partner system 104. Specifically, the partner system 104 can be any computing device operable to communicate with the FI system 106, other partner systems 104, and/or other components via network 126, as well as with the network 126 itself, using a wireline or wireless connection. In general, partner system 104 comprises an electronic computer device operable to receive, transmit, process, and store any appropriate data associated with the system 100 of FIG. 1.

The loyalty management application 134, executed on the partner system 104, can include any suitable application, program, mobile app, or other component. The loyalty management application 134 can interact with the financial institution applications (e.g., account management application 108) and the FI system 106 via network 126. In some instances, the loyalty management application 134 can be accessed via a web browser, where the functionality of the loyalty management application 134 can be realized using a web application or website with which the user can interact via the GUI. In other instances, the loyalty management application 134 can be a remote agent, component, or client-side version of the FI system 106 and/or any of its individual components. In some instances, the loyalty management application 134 can interact directly with the FI system 106 or portions thereof. The loyalty management application 134 can be used to view, interact with, and or redeem one or more benefits associated with a loyalty account 138 stored in a partner database 136.

The loyalty management application 134 can be associated with a partner database 136 that includes and/or stores information regarding one or more loyalty accounts 138, where the loyalty management application 134 is used to manage information related to and operation of a loyalty or rewards program offered by the partner. The loyalty management application 134 can be part of a retailer or merchant system, including an end-to-end enterprise resource management application, where the loyalty management application 134 is used to manage loyalty-related transactions and accounts, as well as receive and operate on information received from the FI system 106 related to loyalty-related activities and transactions. The loyalty management application 134 can be used to track and manage the accumulation of points and loyalty events or information based on transactions and account-related actions, where the loyalty management application 134 allows users to obtain and access benefits related to account and retailer/merchant/service provider interactions. The benefits can be used to entice additional interactions and spending to customers, retain existing customers, and attract new customers. The loyalty management application 134 can be operated or executed by one or more partners or other entities, subsidiaries, or companies that provide loyalty or reward accounts. As illustrated, the loyalty management application 134 can be associated with a partner database 136, at which information associated with particular loyalty accounts can be stored and managed. Information related to the loyalty management application 134 can be stored in any suitable location, but is illustrated as stored in the partner database 136.

As illustrated, the partner database 136 can store a plurality of loyalty accounts 138, each loyalty account 138 associated with a set of loyalty account credentials 140. The loyalty account credentials 140 can be associated with a unique identifier for the corresponding loyalty account 138, which can be mapped to or otherwise related to or associated with a particular customer account 112 or accounts. Loyalty account credentials 140 can be, for example, a username and password, a biometric signature (e.g., fingerprint or 3D facial scan etc.), or a personal identification number (PIN), as well as any other suitable credentials. Each loyalty account 138 can be associated with a loyalty benefits level 146, including a reward point balance 148 that identifies a current amount of reward points or other accumulated value (e.g., free nights, cash back, etc.) available to the loyalty account 138 and corresponding customer. The benefits level 146 can also include perks 150. Customers associated with particular loyalty accounts 138 can earn benefits levels 146 by purchasing particular goods or services using a particular payment method 155, or by achieving a certain level or status. In one instance, a user 102 can receive rewards points 148 or a multiple thereof for every dollar spent on airline tickets that the customer purchases with a specific airline. In another instance, the user can earn perks 150 by regularly staying in a particular hotel chain. Additionally, the partner database 136 can associate a profile 142 with each particular loyalty account 138. The profile 142 can include information about or related to the particular customer associated with the loyalty account 138 and one or more payment methods 155 associated with the customer. The payment method 155 can be a payment method associated with the FI 106, for example credit card information that withdraws funds from the customer account 112. In another example, the payment method 155 can be a routing number and checking account number associated with the customer account 112. The profile 142 can include loyalty account-related preferences, among others.

The partner database 136 can further include a reward catalog (not shown) identifying one or more rewards and their corresponding reward points cost. The one or more rewards in the reward catalog can be for specific goods or services, discounts on purchases or transactions associated with one or more providers, or access to provider-specific goods or services, including some that may not be offered to the general public or non-customers of the financial institution. In some instances, the reward benefit levels 146 can also include one or more perks 150 provided by the partner in tiers. For example, if a user, in the past 12 months, has spent or otherwise interacted with the loyalty provider (e.g., number of miles flown, number of nights stayed) above a first predetermined amount associated with a first benefits level in the past 12 months, they may have earned or be provided access to a first tier of perks 150. In another example, if the user has spent over a second predetermined amount associated with a second tier of benefits in the past 12 months, they may have access to a second tier of perks 150. In other instances, the perk tiers can be based on total time as a loyalty account holder, the previous 3 months of spending, or any other suitable evaluation or requirement. Perks 150 can include, but are not limited to, exclusive lounge access, VIP services (e.g., VIP queues at a rental car facility or airport), free upgrades (e.g., first class tickets, larger hotel suite, etc.), or any other suitable upgrade or benefit. In some instances, the loyalty management application 134 can allow the customer to view and interact with the rewards catalog to browse and redeem particular rewards using available point values. Additionally, based on browsing history, one or more items in the reward catalog can be provided to the user as a suggested redemption option.

Each loyalty account 138 may be associated with one or more linked accounts 152. Linked accounts 152 can be loyalty accounts associated with a user who is different than the user of the loyalty account 138. If two loyalty accounts are linked, they may be able to share rewards points 148 (i.e., via a combined pool of rewards points) and earned perks 150. By linking a loyalty accounts 138 with one or more linked accounts 152, more than one user can contribute earning to benefits levels 146 and redeeming or exercising the rewards points 148 or perks 150. In particular, a primary user may be able to share their benefits with one or more authorized users of a card or payment instrument.

A point balance processor 154 can perform operations associated with crediting reward points 148 when points are determined, as well as debiting reward points 148 when redemptions occur. To credit accounts, the point balance processor 154 can determine a spending amount of a customer based on transactions associated with the partner using the payment method 155 during a particular period when points are assessed. In response to the transactions performed and/or the actions taken by the customer, the point balance processor 154 can identify points to be awarded, and can credit the corresponding loyalty account 138 of that customer. Similarly, when a reward is redeemed, in response to a customer selection and redemption without an offer, the point balance processer 154 can debit the rewards points 148 accordingly. The point balance processor 154 can receive information from the partner, as well as from the FI system 106, among others, to review and process point-related actions and transactions, and to then credit or debit corresponding loyalty accounts 138.

While portions of the elements illustrated in FIG. 1 are shown as individual modules that implement the various features and functionality through various objects, methods, or other processes, the software can instead include a number of sub-modules, third-party services, components, libraries, and such, as appropriate. Conversely, the features and functionality of various components can be combined into single components as appropriate.

Figure 2:
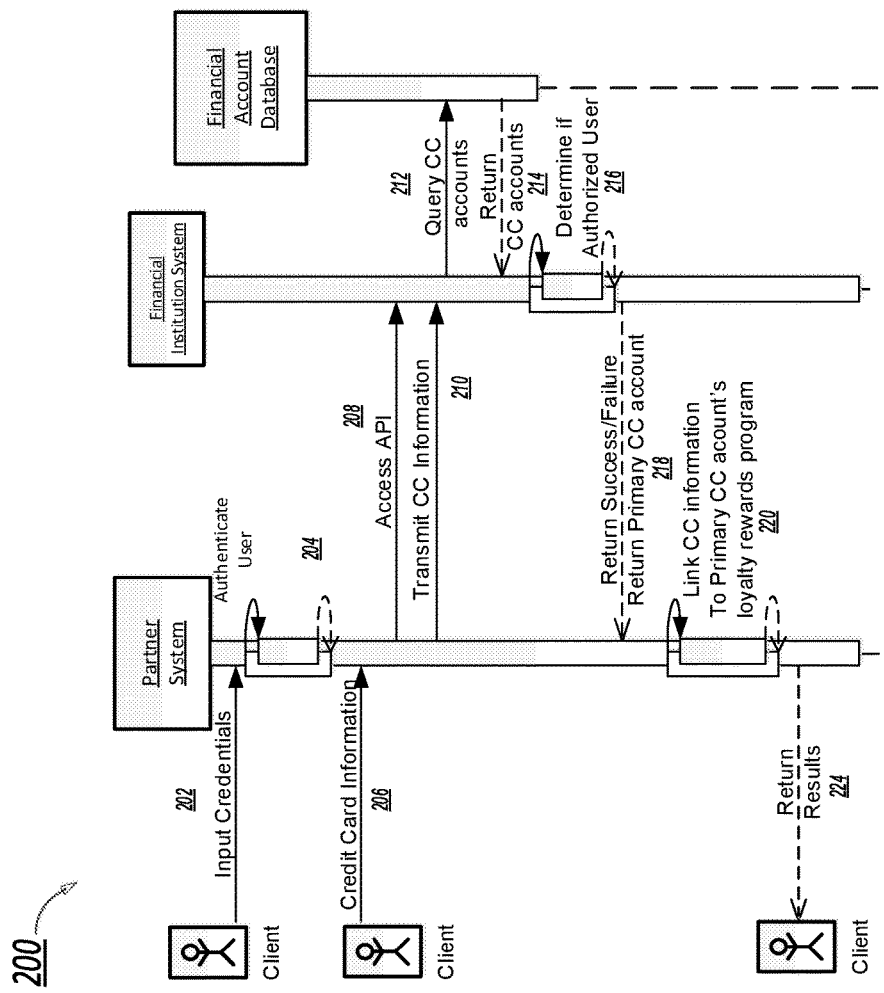
FIG. 2 depicts a swim-lane diagram showing a method for linking loyalty accounts.

FIG. 2 depicts a swim-lane diagram showing a method for linking loyalty rewards accounts. A user can be associated with a loyalty rewards program provided or administered by a partner (e.g., an airline, a hotel, etc.). The user can be an authorized user on a credit (or debit) account associated with a FI system. The credit account can be associated with a primary user (not depicted) and one or more authorized users. The user can have his or her own individual credit card, which may have a unique personal account number (PAN), where the card can be used to access the credit of the credit account associated with the primary user and to which they are provided access as an authorized user. In this system, the user can input credentials associated with their loyalty account (202) at a webpage, portal, mobile application, or other interface provided by the partner system. The partner system can receive those credentials and can then verify the user's credentials to perform an authentication operation (204). The location at which the credentials can be submitted may be a website, portal, mobile or web-based application, kiosk, or other suitable location accessible by the user to interact with the partner system. In this manner, the partner system can authenticate the user.

Once the partner system has authenticated the user, the user can be prompted to input their credit account information for verification (at 206). The credit account information can be, for example, the user's name and the last four digits of the credit account number. In another example, the credit account information can be a date of birth, name, and/or billing address, or any other set or combination of information required to authenticate and/or determine a particular credit account associated with the user. The partner system can verify the credit account information by accessing an API 208 of a FI system, such as FI system 106 of FIG. 1. The partner system can pass to the FI system the credit account information of the user and that the user is authenticated (at 210). The FI system can then query a financial account database for a credit account associated with the credit account information from the user (at 212). The financial account database can include a multitude of customer accounts, each account having a profile designating a primary user, and optionally, one or more authorized users (e.g., as discussed with reference to FIG. 1). The financial account database can return one or more credit accounts based on the FI system's query 214. In some instances, the FI system can also store loyalty data associated with the authenticated user. Based on the returned accounts the FI system can determine if the user who has been authenticated is an authorized user of a customer account that is associated with a primary user (at 216).

If the FI is able to verify that the provided credit account information is associated with an authorized user of a credit account, the FI can return a success message via the API, where the success message contains information associated with the customer account and the primary user (at 218). If the FI is unable to verify the provided credit information is associated with an authorized user of a credit account, then the FI system can send a failure message or an error message to the partner system.

Upon receipt of a success message containing information associated with a credit account and a primary user associated with the credit account, the partner can then link the loyalty account of the primary account holder with the loyalty account of the user (220). After successful linking, the authorized user can be provided access to benefits earned by and provided to the loyalty account of the primary account holder. Once the authorized user has their loyalty rewards account linked to the loyalty rewards account of the primary user, they may be able to share rewards points (i.e., have a combined pool rewards points) and perks. In some instances, limited sharing may be possible, such as obtaining some automatically earned benefits associated with a particular loyalty level, but not being able to redeem points for purchases or upgrades. In some instances, such restrictions and allowances may be set by the primary user in a separate interaction. By linking a loyalty rewards accounts with one or more linked accounts of authorized users, those authorized users can contribute to earning benefits and/or redeem or exercise existing benefits earned by the account. The results of the successful linking can be displayed to the user by the partner system (at 224).

If the financial institution system determines that the credit account information of the user is not associated with any account in the database, or is not associated with the account of an authorized user, the financial institution system can return an error message or failure message to the partner system (at 218). After receiving the error message the partner can ask the user to verify the inputted information and retry, or otherwise inform the user that the linking has failed (at 224). In some instances, when the user does not have a preexisting loyalty account, the partner can ask the user to open a new loyalty account to be linked to the existing primary user's account. In these instances, the user may create a new loyalty account associated with themselves, and the new loyalty account can be linked to a loyalty account of a primary user.

Figure 3:
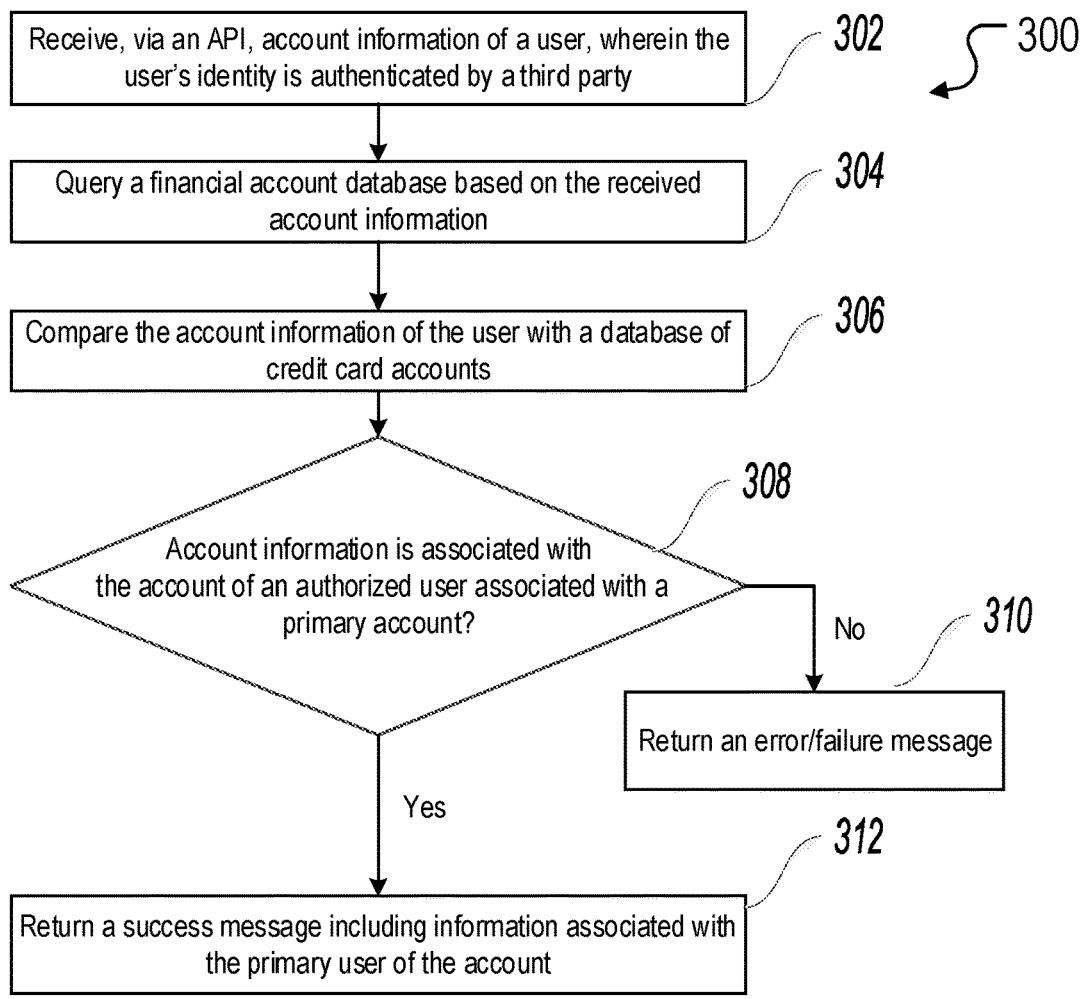
FIG. 3 is a flowchart describing a method for linking loyalty accounts from the perspective of a financial institution system.

FIG. 3 is a flow diagram of an example method 300 for automatically linking loyalty accounts from the perspective of a financial institution system in one example implementation. However, it will be understood that method 300 may be performed, for example, by any other suitable system, environment, software, and hardware, or a combination of systems, environments, software, and hardware as appropriate. In some instances, method 300 can be performed by the FI system 106, or portions thereof, described in FIG. 1, as well as other components or functionality described in other portions of this description. In other instances, method 300 may be performed by a plurality of connected components or systems. Any suitable system(s), architecture(s), or application(s) can be used to perform the illustrated operations.

In one instance, method 300 describes a method performed within a system of a financial institution or card provider comprising a communications module, at least one memory, and at least one hardware processor interoperably coupled with the at least one memory and the communications module. The at least one memory can include a repository storing a plurality of customer accounts for one or more customers. Each customer account in the plurality of customer accounts can be associated with a particular customer identified as a primary user, and the customer account can store at least an account balance. In some instances, the customer account can store information about customer spending, transactions, analytics, and a customer profile. Each customer account may have one or more designated authorized users, where those authorized users can access and have authority to initiate transactions for at least portions of the customer account. The memory may also store instructions that instruct the at least one hardware processor to perform particular operations.

Turning to method 300, at 302, credit account information of an authenticated user is received from a partner system via an API. In some instances, the API can be hosted by a financial institution system such as FI system 106 described in FIG. 1. The API can allow communications between a partner system and the financial institution system at a reliable interface or entry point, where the communications are used to verify an authenticated user is an authorized user associated with a credit account and transfer data associated with the credit account. The received information can also include information associated with the authenticated user, which allows the financial institution to ensure the received account information is provided by an individual who is authorized to access the account. For example, the received information can include the name of the authenticated user, credit account information associated with the authenticated user, as well as a loyalty account or other information (e.g., date of birth, billing address, etc.). In some instances, the received information can include a certificate generated by the partner, which indicates that the user has inputted appropriate credentials at a partner system. The credit account information can comprise any suitable combination of a name, expiration date, credit card number, CVV code, or billing address, among other things, including a user name and/or password associated with the credit account.

At 304, a query is sent to a financial account database based on the account information received at 302. In some instances, the financial account database can be similar to the financial account database 110 as described in FIG. 1 and can include customer accounts, with each customer account indicating a primary user and, optionally, one or more authorized users. The financial account database can return one or more customer accounts that include and correspond to the account information received at 302.

At 306, a comparison to the queried database with the account information received at 302 is performed. At 308, a determination is made as to whether the database contains any customer accounts associated with the received account information and whether the account information is associated with an authorized user of a customer account. If it is determined that the account information is associated with an authorized user method 300 proceeds to 312; otherwise, method 300 proceeds to 310.

In response to determining that the account information is not associated with an authorized user, method 300 returns an error or failure message at 310. This message can include specific details about why the determination was not successful. For example, the message can say that no matching account information has been found. In another example, the message can indicate that the matching account has no authorized user. In some implementations the message can include an error code indicating a reason for failure or provide troubleshooting guidance.

At 312, in response to determining that the account information is associated with an authorized user, a success message is returned that includes information associated with the primary user of the account. The information associated with the primary user of the customer account may be any suitable combination of a name of the primary user, an address of the primary user, a date of birth, or an account number. The information associated with the primary user can then be used by a partner system to link a new or existing loyalty account of the authenticated user to an existing loyalty account of the primary user. After successful linking, the authorized user can be provided access to benefits earned by and provided to the loyalty account of the primary account holder. Once the authorized user has their loyalty rewards account linked to the loyalty rewards account of the primary user, they may be able to share rewards points (i.e., have a combined pool of rewards points) and perks. In some instances, limited sharing may be possible, such as obtaining some automatically earned benefits associated with a particular loyalty level, but not being able to redeem points for purchases or upgrades. In some instances, such restrictions and allowances may be set by the primary user in a separate interaction. By linking a loyalty rewards account with one or more linked accounts of authorized users, those authorized users can contribute to earning benefits and/or redeem or exercise existing benefits earned by the account. The results of the successful linking can be displayed to the user by the partner system (at 224).

Figure 4:
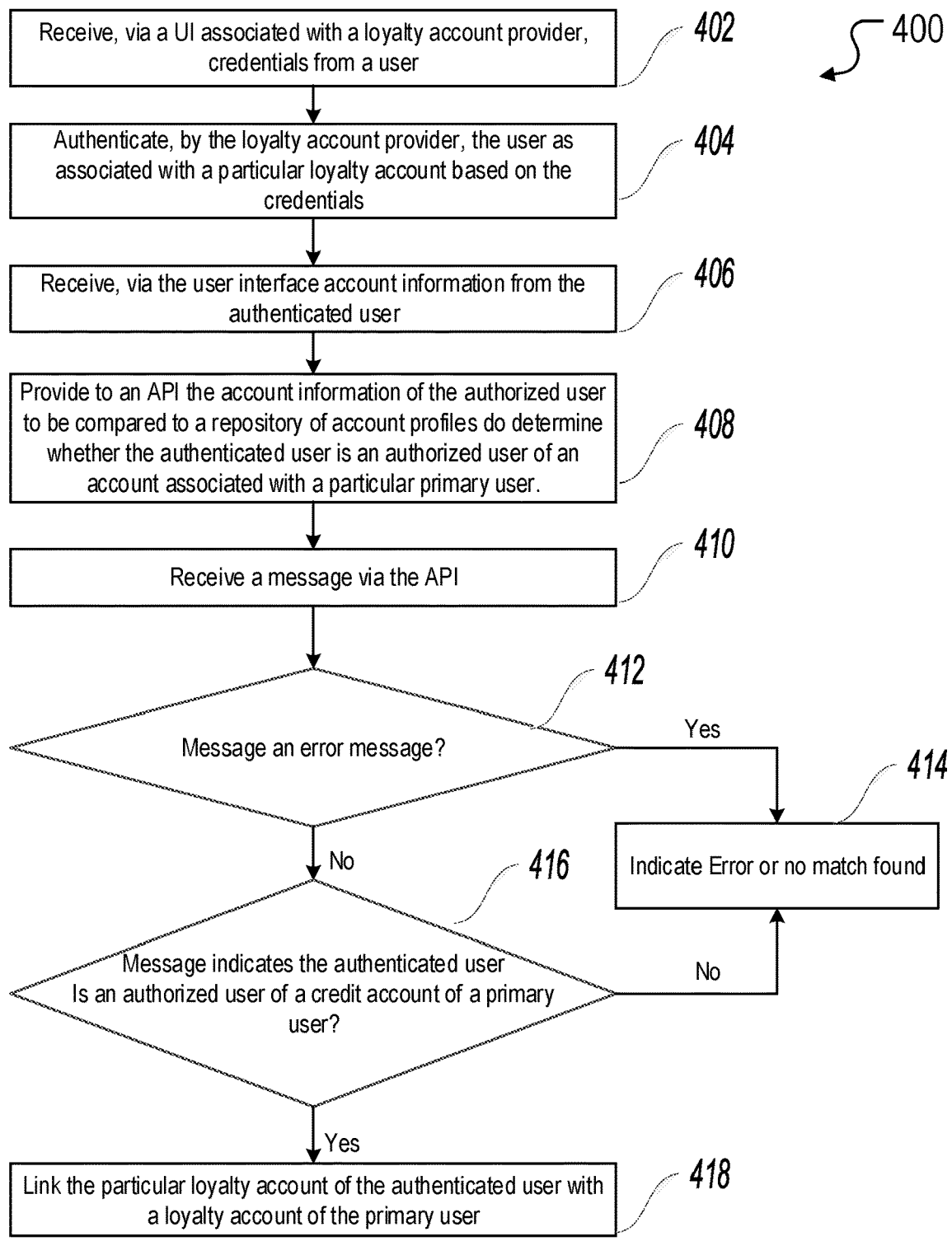
FIG. 4 is a flowchart describing a method for linking loyalty accounts from the perspective of a partner system.

FIG. 4 is a flow diagram of an example method 400 for automatically linking loyalty accounts from the perspective of a partner system in one example implementation. However, it will be understood that method 400 may be performed, for example, by any other suitable system, environment, software, and hardware, or a combination of systems, environments, software, and hardware as appropriate. In some instances, method 400 can be performed by the partner system 104, or portions thereof, described in FIG. 1, as well as other components or functionality described in other portions of this description. In other instances, method 400 may be performed by a plurality of connected components or systems. Any suitable system(s), architecture(s), or application(s) can be used to perform the illustrated operations.

In one instance, method 400 describes a method performed within a partner system or loyalty rewards program provider comprising a communications module, at least one memory, and at least one hardware processor interoperably coupled with the at least one memory and the communications module. The at least one memory can include a repository storing a plurality of loyalty accounts for one or more customers. Each loyalty account in the plurality of loyalty accounts can be associated with a particular user identified, wherein the loyalty account stores at least a rewards points balance, as well as in some instances additional perk benefits, a method of payment, transactions, user credentials, and a user profile. Each customer account may have one or more designated authorized users who can access at least portions of the account and have the authority to initiate transactions associated with the account. The memory may also store instructions that instruct the at least one hardware processor to perform particular operations.

At 402, credentials are entered via a user interface (UI) associated with a partner system. In some instances, the partner system may be the partner system 104 of FIG. 1. The partner system may be, for instance, a loyalty account provider (e.g., a frequent flyer provider, a hotel rewards provider, a grocery store members club, etc.). The credentials can represent a unique identifier that can be evaluated to insure that a user inputting the credentials is authentic. In some instances, credentials may include a unique username and a corresponding password. In another instance, the credentials may be, or can include, a biometric authorization (e.g., fingerprints, iris scans, etc.). In some instances, a user's ability to log onto a cryptographically-protected mobile device, such as by facial or fingerprint scans, may be used to identify the user via the UI. Any other suitable authentication technique or inputs can be used.

At 404, the partner system authenticates the user based on the inputted credentials. An authenticated user is a user who is, after authentication, is determined to be associated with a particular loyalty account and has been verified by the partner system. By authenticating the user, any additional information provided by the user may be assumed to be provided with the authorization of the user of the loyalty account, and that a malicious party is not fraudulently attempting to link loyalty accounts that are associated with otherwise unrelated users.

At 406, account information associated with the authenticated user is received via a UI. The UI can prompt the authenticated user, who can input the information via touchscreen, keyboard and mouse, and/or scanned photograph, among other things. The account information can comprise any suitable combination of a name, expiration date, credit card number, CVV code, or billing address.

At 408, the partner system provides the account information to the financial institution system via an API. The financial institution system 106 can then determine if the authenticated user is an authorized user via similar operations to method 300 as discussed with reference to FIG. 3.

At 410, a message is received via the API, and method 400 proceeds to 412, where it is determined whether the message is an error message.

At 412, a determination is made as to whether the message is an error message. If it is determined that the message is an error message, the partner system can present for display, at the UI, the error or an error code associated with the error message (414). In some implementations the partner system 104 can present the authenticated user with a prompt to verify their account information, in which case method 400 can restart at 406. Otherwise method 400 can end at 414 with no loyalty accounts being linked.

Returning to 412, if it is determined that the message is not an error message, method 400 proceeds to 416, where it is determined whether the message indicates the authenticated user is an authorized user of a customer account, and the message includes information associated with a primary user of the customer account. The information associated with the primary user of the customer account may be any suitable combination of a name of the primary user, an address of the primary user, a date of birth, or an account number. In some instances the customer account is the customer account 112 as described in FIG. 1.

If it is determined that the message does not indicated the authenticated user is an authorized user of a customer account, method 400 returns to 414.

Otherwise if it is determined that the message indicates the authenticated user is an authorized user of a credit account of a primary user, at 418 the loyalty account of the authenticated user is linked with the loyalty account of the primary user. When two loyalty accounts are linked, they can share rewards points (i.e., have a combined pool rewards points) and perks. By linking a loyalty rewards accounts with linked accounts more than one user can contribute earning benefits levels and redeeming or exercising rewards points or perks.

The preceding figures and accompanying description illustrate example processes and computer-implementable techniques. However, system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, the described systems and flows may use processes and/or components with or performing additional operations, fewer operations, and/or different operations, so long as the methods and systems remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The invention claimed is:

1. A financial institution computing system comprising:
a communications module;
at least one memory storing instructions for verifying authorized users of credit accounts, a repository storing a plurality of account profiles associated with a plurality of accounts, each account profile associated with a primary user, wherein at least one of the plurality of account profiles is further associated with at least one authorized user;
at least one hardware processor interoperably coupled with the at least one memory and the communications module, wherein the instructions instruct the at least one hardware processor to:
receive, from a loyalty system managing a plurality of loyalty accounts via a dedicated application programming interface (API), the API hosted on a network by the financial institution computing system, credit account information associated with an authenticated user, wherein the loyalty system is separate and distinct from the financial institution system, wherein an authenticated user is a user who was previously authenticated by the loyalty system, and wherein the credit account information is associated with the financial institution;
in response to receiving the credit account information via the dedicated API, automatically initiate a query of the repository of account profiles for accounts associated with the credit account information;
identify results from the initiated query and automatically compare the received credit account information associated with the authenticated user with the results from queried repository;
determine, by the at least one hardware processor and based on the comparison, whether the authenticated user is an authorized user of a credit account associated with a particular primary user, wherein the particular primary user is different from the authorized user;
in response to determining that the authenticated user is an authorized user of the credit account associated with the particular primary user, automatically generate a success message comprising information necessary to link a loyalty account associated with the authorized user with a loyalty account associated with the particular primary user, wherein the loyalty account associated with the particular primary user is managed by the loyalty system and is different than the credit account associated with the particular primary user; and
return, via the API, the success message to the loyalty system.

2. The system of claim 1, wherein the success message is used by the loyalty system to link the loyalty account associated with the authorized user with the loyalty account associated with the particular primary user, wherein the loyalty account associated with the particular primary user is associated with a set of earned benefits, and wherein, after linking the loyalty account associated with the particular primary user to the loyalty account associated with the authorized user, the set of earned benefits are applied to the loyalty account associated with the authorized user at the loyalty system.

3. The system of claim 2, wherein the set of earned benefits comprise perks and rewards points, and wherein the rewards points are redeemable for rewards.

4. The system of claim 3, wherein the authorized user of a linked loyalty account earns benefits based on transactions associated with the credit account.

5. The system of claim 1, wherein the instructions instruct the at least one hardware processor to:
in response to determining the authenticated user is not an authorized user, return a failure message, wherein the failure message comprises an error code, and wherein the loyalty account of the authorized user is not linked to the loyalty account of a particular primary user.

6. The system of claim 1, wherein the account information associated with the authenticated user comprises:
an account number or partial account number and at least one of:
a name on the account;
a date of birth of the authenticated user; or
an address associated with the account.

7. The system of claim 1, wherein the account information associated with the authorized user is linked to the loyalty account associated with the particular primary user.

8. A computer-implemented method for linking loyalty accounts performed by one or more processors associated with a financial institution system, the method comprising:
receiving, from a loyalty system managing a plurality of loyalty accounts via a dedicated application programming interface (API), the API hosted on a network by the financial institution computing system, credit account information associated with an authenticated user, wherein the loyalty system is separate and distinct from the financial institution system, wherein an authenticated user is a user who was previously authenticated by the loyalty system, and wherein the credit account information is associated with the financial institution;
in response to receiving the credit account information via the dedicated API, automatically initiating a query of a repository of account profiles for accounts associated with the credit account information;
identifying results from the initiated query and automatically compare the received credit account information associated with the authenticated user with the results from queried repository;
determining, by the one or more processors and based on the comparison, whether the authenticated user is an authorized user of a credit account associated with a particular primary user, wherein the particular primary user is different from the authorized user;
in response to determining that the authenticated user is an authorized user of the credit account associated with the particular primary user, automatically generating a success message comprising information necessary to link a loyalty account associated with the authorized user with a loyalty account associated with the particular primary user, wherein the loyalty account associated with the particular primary user is managed by the loyalty system and is different than the credit account associated with the particular primary user; and
returning, via the API, the success message to the loyalty system.

9. The method of claim 8, wherein the success message is used by the loyalty system to link the loyalty account associated with the authorized user with the loyalty account associated with the particular primary user, wherein the loyalty account associated with the particular primary user is associated with a set of earned benefits, and wherein, after linking the loyalty account associated with the particular primary user to the loyalty account associated with the authorized user, the set of earned benefits are applied to the loyalty account associated with the authorized user at the loyalty system.

10. The method of claim 9, wherein the set of earned benefits comprise perks and rewards points, and wherein the rewards points are redeemable for rewards.

11. The method of claim 10, wherein the authorized user of a linked loyalty account earns benefits based on transactions associated with the credit account.

12. The method of claim 8, comprising:
in response to determining the authenticated user is not an authorized user, return a failure message, wherein the failure message comprises an error code, and wherein the loyalty account of the authorized user is not linked to the loyalty account of a particular primary user.

13. The method of claim 8, wherein the account information associated with the authenticated user comprises:
an account number or partial account number and at least one of:
a name on the account;
a date of birth of the authenticated user; or
an address associated with the account.

14. The method of claim 8, wherein the account information associated with the authorized user is linked to the loyalty account associated with the particular primary user.

15. A non-transitory, computer-readable medium storing computer-readable instructions executable by a computer and, when executed, cause the computer to:
receive, from a loyalty system managing a plurality of loyalty accounts via a dedicated application programming interface (API), the API hosted on a network by the financial institution computing system, credit account information associated with an authenticated user, wherein the loyalty system is separate and distinct from the financial institution system, wherein an authenticated user is a user who was previously authenticated by the loyalty system, and wherein the credit account information is associated with the financial institution;
in response to receiving the credit account information via the dedicated API, automatically initiate a query of a repository of account profiles for accounts associated with the credit account information;
identify results from the initiated query and automatically compare the received credit account information associated with the authenticated user with the results from queried repository;
determine, by the one or more processors and based on the comparison, whether the authenticated user is an authorized user of a credit account associated with a particular primary user, wherein the particular primary user is different from the authorized user;
in response to determining that the authenticated user is an authorized user of the credit account associated with the particular primary user, automatically generate a success message comprising information necessary to link a loyalty account associated with the authorized user with a loyalty account associated with the particular primary user, wherein the loyalty account associated with the particular primary user is managed by the loyalty system and is different than the credit account associated with the particular primary user; and
return, via the API, the success message to the loyalty system.

16. The non-transitory, computer-readable medium of claim 15, wherein the success message is used by the loyalty system to link the loyalty account associated with the authorized user with the loyalty account associated with the particular primary user, wherein the loyalty account associated with the particular primary user is associated with a set of earned benefits, and wherein, after linking the loyalty account associated with the particular primary user to the loyalty account associated with the authorized user, the set of earned benefits are applied to the loyalty account associated with the authorized user at the loyalty system.

17. The non-transitory, computer-readable medium of claim 16, wherein the set of earned benefits comprise perks and rewards points, and wherein the rewards points are redeemable for rewards.

18. The non-transitory, computer-readable medium of claim 17, wherein the authorized user of a linked loyalty account earns benefits based on transactions associated with the credit account.

19. The non-transitory, computer-readable medium of claim 15, comprising:
in response to determining the authenticated user is not an authorized user, return a failure message, wherein the failure message comprises an error code, and wherein the loyalty account of the authorized user is not linked to the loyalty account of a particular primary user.

20. The non-transitory, computer-readable medium of claim 15, wherein the account information associated with the authenticated user comprises:
an account number or partial account number and at least one of:
a name on the account;
a date of birth of the authenticated user; or
an address associated with the account.

* * * * *